(12) United States Patent
Son et al.

(10) Patent No.: US 11,347,077 B2
(45) Date of Patent: May 31, 2022

(54) CAMERA MODULE WITH TILTING PART

(71) Applicant: LG INNOTEK CO., LTD., Seoul (KR)

(72) Inventors: Chang Gyun Son, Seoul (KR); Ji Sung Kim, Seoul (KR); Soo Min Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/972,768

(22) PCT Filed: Jun. 7, 2019

(86) PCT No.: PCT/KR2019/006898
§ 371 (c)(1),
(2) Date: Dec. 7, 2020

(87) PCT Pub. No.: WO2019/235888
PCT Pub. Date: Dec. 12, 2019

(65) Prior Publication Data
US 2021/0239999 A1    Aug. 5, 2021

(30) Foreign Application Priority Data
Jun. 8, 2018  (KR) .................. 10-2018-0066203

(51) Int. Cl.
*G02B 27/64* (2006.01)
*G03B 30/00* (2021.01)
(Continued)

(52) U.S. Cl.
CPC ....... *G02B 27/646* (2013.01); *G02B 13/0065* (2013.01); *G03B 30/00* (2021.01);
(Continued)

(58) Field of Classification Search
CPC .. G02B 27/646; G02B 13/0065; G03B 30/00; H04N 5/2254; H04N 5/2257; H04N 5/2328; H04N 5/23283
See application file for complete search history.

(56) References Cited

U.S. PATENT DOCUMENTS

2006/0132614 A1  6/2006  Lee et al.
2009/0067051 A1  3/2009  Cho et al.
(Continued)

FOREIGN PATENT DOCUMENTS

CN  101008766 A  8/2007
KR  10-2006-0071224 A  6/2006
(Continued)

*Primary Examiner* — Nicholas G Giles
(74) *Attorney, Agent, or Firm* — Birch, Stewart, Kolasch & Birch, LLP

(57) ABSTRACT

A camera module according to an embodiment of the present invention includes a prism part configured to convert incident light to parallel light in an optical axis direction, a tilting part through which the parallel light passes and which changes an optical path of the parallel light by changing an angle of a surface through which the parallel light passes, a lens part configured to collect the parallel light of which the optical path is changed, and an image sensor part configured to convert the parallel light collected by the lens part to an electrical signal, wherein the tilting part is disposed between the prism part and the lens part.

15 Claims, 7 Drawing Sheets

(51) Int. Cl.
*G02B 13/00* (2006.01)
*H04N 5/225* (2006.01)
*H04N 5/232* (2006.01)

(52) U.S. Cl.
CPC ......... *H04N 5/2254* (2013.01); *H04N 5/2257* (2013.01); *H04N 5/2328* (2013.01); *H04N 5/23283* (2013.01)

(56) References Cited

U.S. PATENT DOCUMENTS

2012/0249815 A1 10/2012 Bohm et al.
2014/0017625 A1 1/2014 Liu et al.
2020/0301116 A1* 9/2020 Aschwanden ........... G02B 3/14

FOREIGN PATENT DOCUMENTS

| KR | 10-2009-0081057 A | 7/2009 |
| KR | 10-2010-0043333 A | 4/2010 |
| KR | 10-2014-0106457 A | 9/2014 |
| KR | 10-1634299 B1 | 6/2016 |
| WO | WO 2017/082509 A1 | 5/2017 |

* cited by examiner

[FIG. 1]
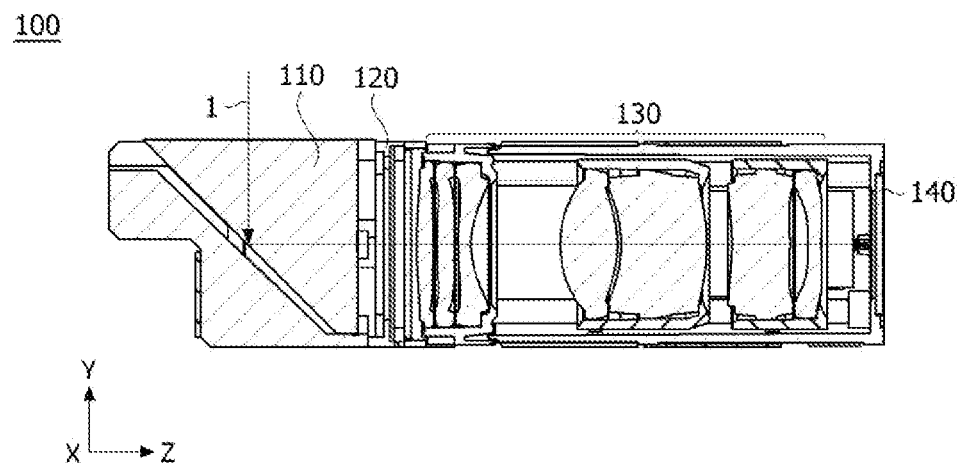
[FIG. 2]
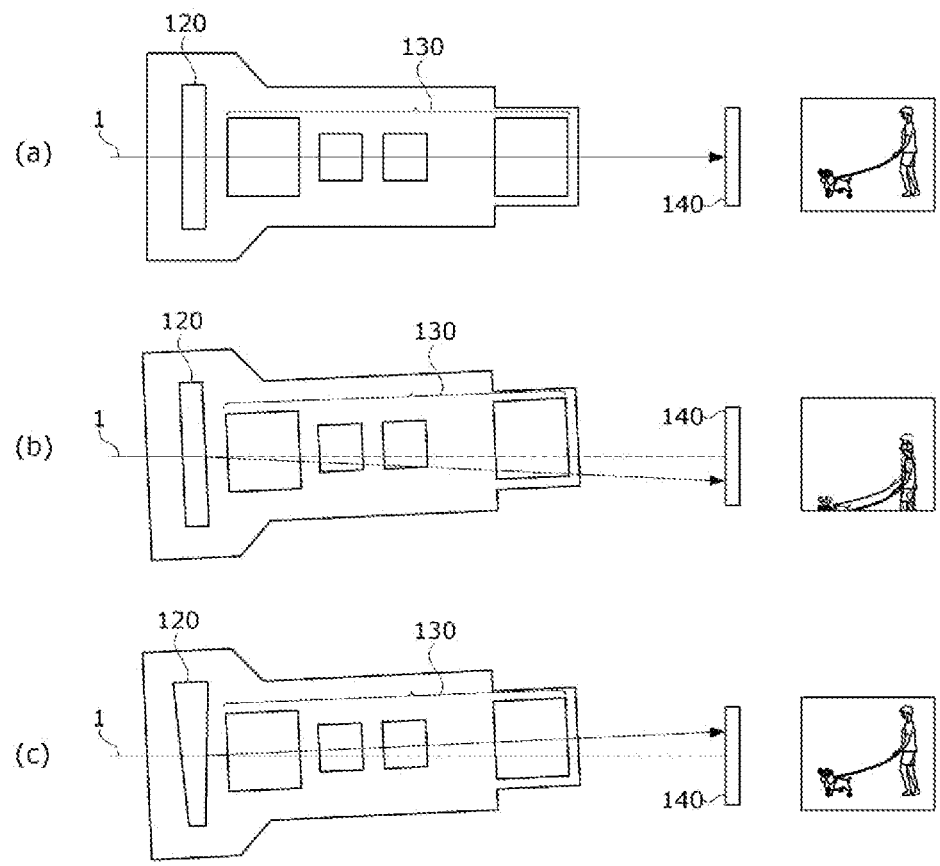

[FIG. 3]
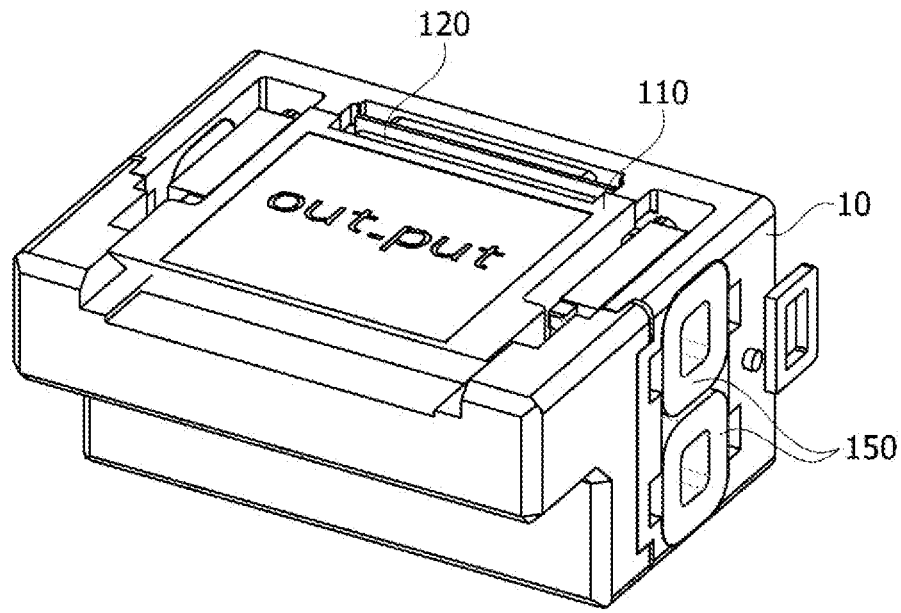
[FIG. 4]
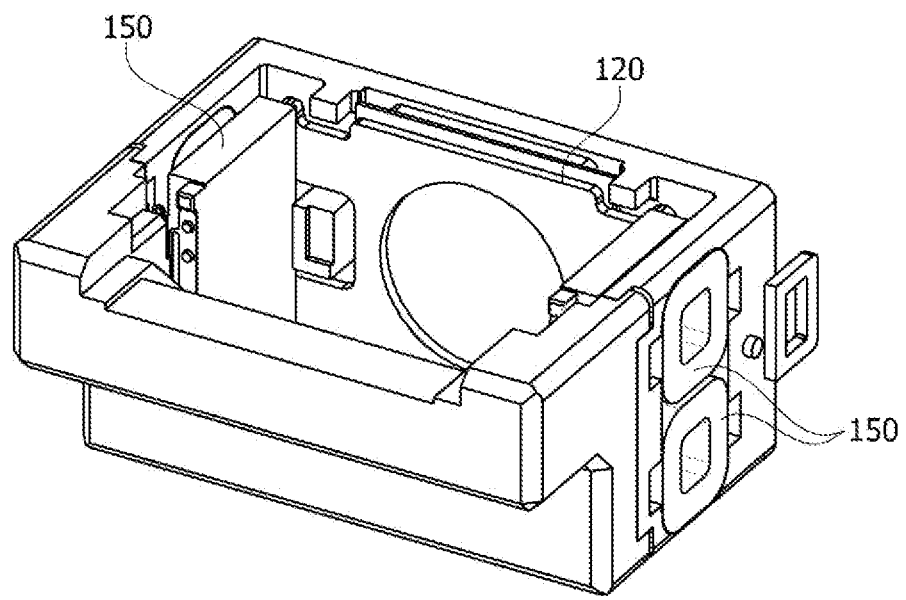

[FIG. 5]
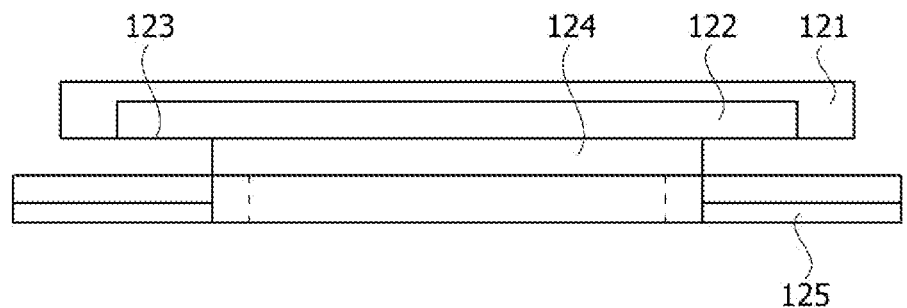
[FIG. 6A]
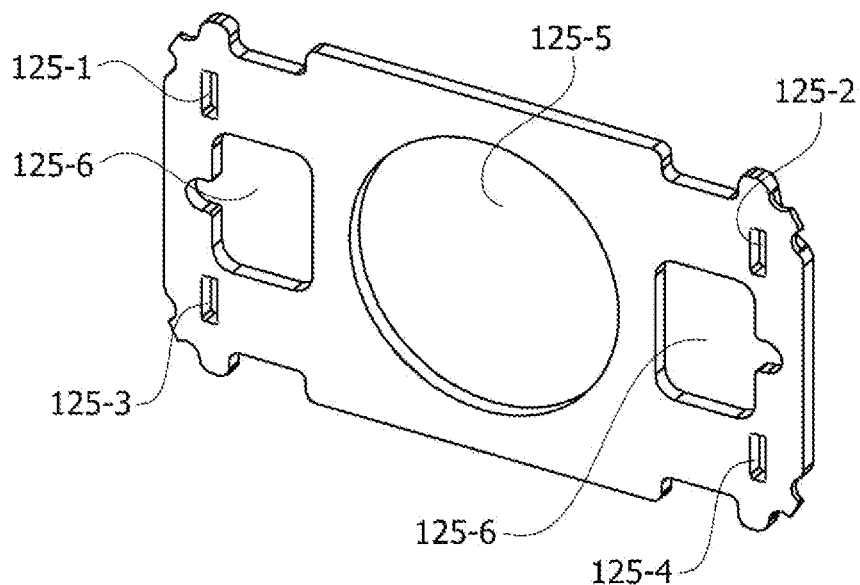
[FIG. 6B]
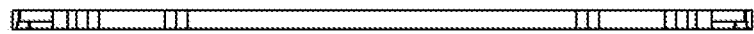

[FIG. 6C]
125
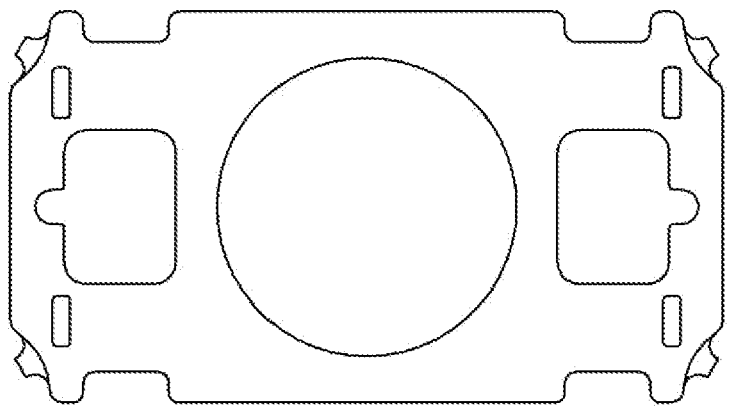
[FIG. 6D]
125
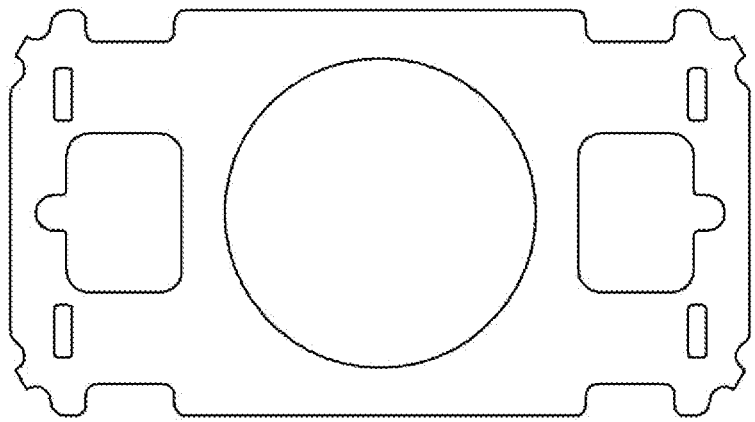

[FIG. 7]
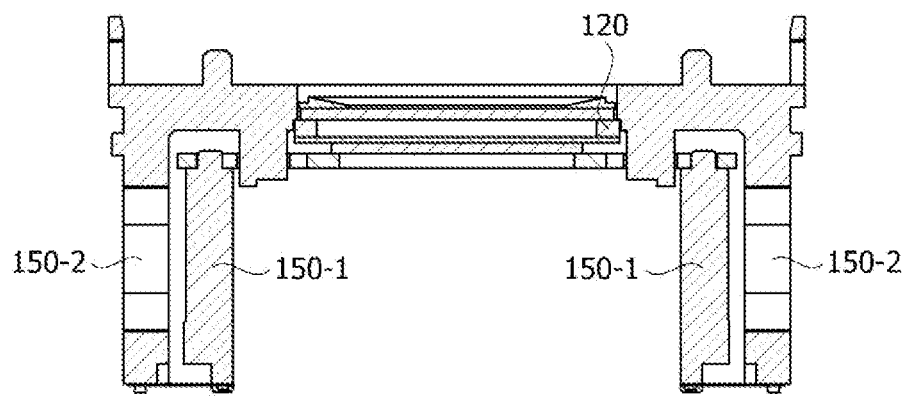
[FIG. 8]
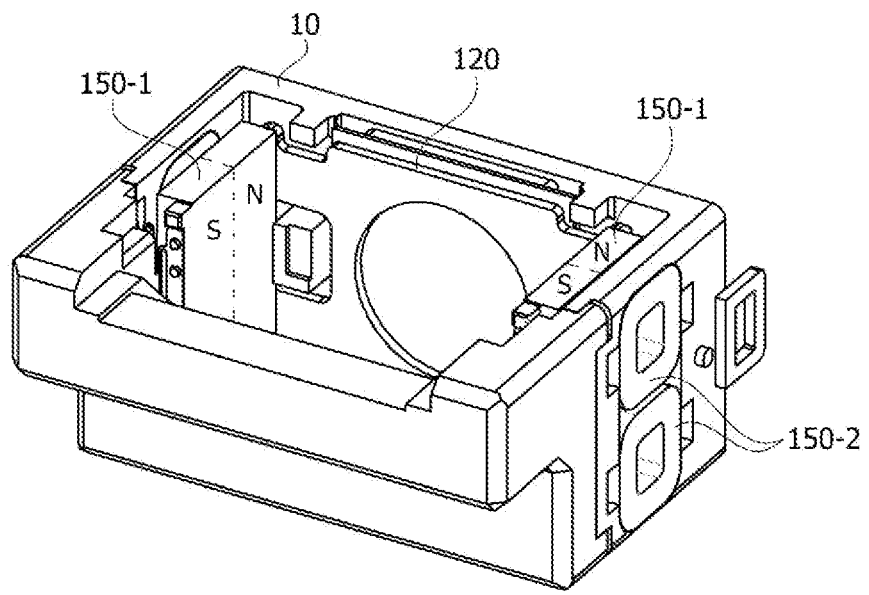

[FIG. 9]
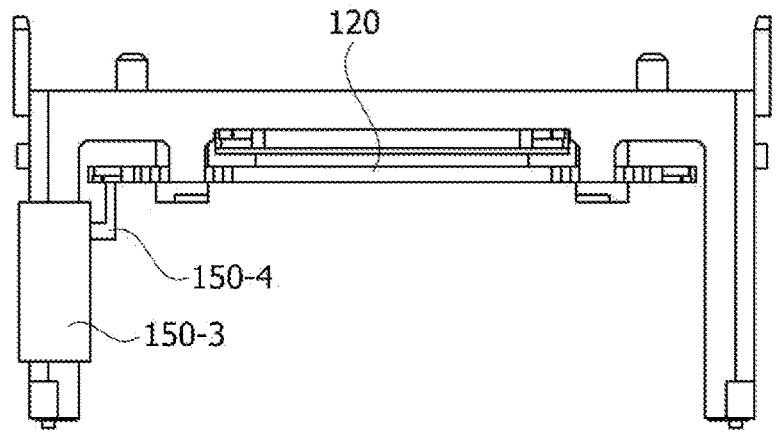
[FIG. 10A]
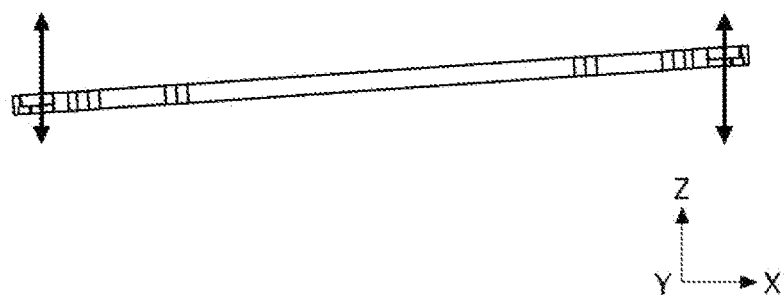
[FIG. 10B]
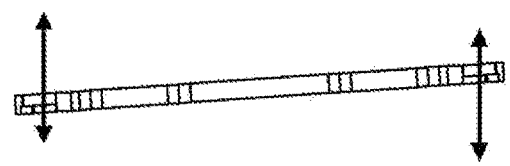
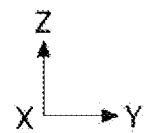

[FIG. 10C]
125
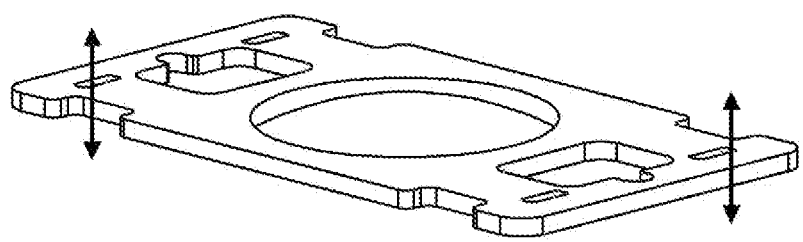
[FIG. 11]
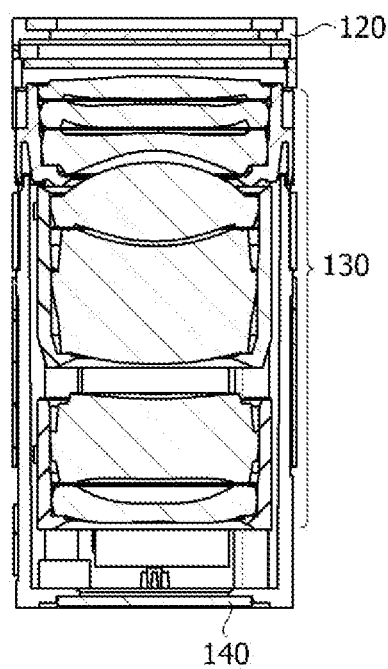

CAMERA MODULE WITH TILTING PART

CROSS REFERENCE TO RELATED APPLICATIONS

This application is the National Phase of PCT International Application No. PCT/KR2019/006898, filed on Jun. 7, 2019, which claims priority under 35 U.S.C. 119(a) to Patent Application No. 10-2018-0066203, filed in the Republic of Korea on Jun. 8, 2018, all of which are hereby expressly incorporated by reference into the present application.

TECHNICAL FIELD

The present invention relates to a camera module.

BACKGROUND ART

Due to the increased demand for small cameras used in mobile phones and mobile devices, the adoption of image stabilization (IS) devices is becoming common in order to prevent image damage caused by camera shaking in photographing with a long exposure time.

An IS technology is a technology for preventing or correcting image shaking caused by the movement of a camera due to an unstable fixing device or gripping. The IS technology is mainly divided into methods using a lens (optical image stabilizer (OIS)) and methods using an image sensor. In addition, the methods of using the OIS are generally divided into lens shift methods in which a lens is moved in the horizontal direction, sensor shift methods in which an image sensor is moved in the horizontal direction, module tilt methods in which an autofocus (AF) module is moved in the horizontal direction, and the like according to an object to be moved in X-axis and Y-axis directions.

In order to correct image shaking due to camera shaking using an OIS, a key factor is to secure an OIS correction angle corresponding to the camera shaking. That is, in order to implement the OIS, a sufficient space allowing the lens, the image sensor, the AF module, and the like to be moved in upward, downward, leftward, and rightward directions should be secured in the camera module.

However, in the case of a mobile terminal, there is a limit of a space for accommodating the camera module. In addition, since the camera components such as the lens are moved, a problem of alignment or durability of the camera module may happen.

Technical Problem

The present invention is directed to providing a camera module having an optical image stabilizer (OIS) function.

Objectives to be solved by the present invention are not limited to the above-described objectives and include purposes or effects which may be understood from solutions or embodiments described below.

Technical Solution

One aspect of the present invention provides a camera module including a prism part configured to convert incident light to parallel light in an optical axis direction, a tilting part through which the parallel light passes and which changes an optical path of the parallel light by changing an angle of a surface through which the parallel light passes, a lens part configured to collect the parallel light of which the optical path is changed, and an image sensor part configured to convert the parallel light collected by the lens part to an electrical signal, wherein the tilting part is disposed between the prism part and the lens part.

The tilting part may include a first flat glass which is a member formed in a flat shape and including a groove formed therein to accommodate liquid and which is formed of a transparent material allowing the parallel light to pass therethrough, an optical liquid layer disposed in the groove of the first flat glass and formed of an optical liquid allowing the parallel light to pass therethrough and having liquidity, a second flat glass which is a member having a flat shape, is disposed on an upper end of the optical liquid layer, and is formed of a transparent material allowing the parallel light to pass therethrough, and a shaper which is a member having a flat shape, which is coupled to one surface of the second flat glass, and in which a hole allowing the parallel light to pass therethrough is formed in a portion coupled to the second flat glass.

The camera module may further include a driving part configured to move the tilting part to control a change of an angle of a surface through which the parallel light passes.

The shaper may be formed in a rectangular flat shape, and a plurality of coupling grooves coupled to the driving part may be formed at corners of the shaper.

The driving part may include a plurality of magnets coupled to the plurality of coupling grooves, and a plurality of coils spaced apart from each other by a predetermined distance to correspond to the plurality of magnets.

In the driving part, each of the number of the plurality of magnets and the number of the plurality of coils may be two.

The tilting part may be controlled by the driving part coupled to two coupling grooves positioned in a diagonal direction of the shaper.

The tilting part may be controlled by the driving part coupled to two coupling grooves positioned in a long axis direction of the shaper.

The tilting part may be controlled by the driving part coupled to two coupling grooves positioned in a short axis direction of the shaper.

The driving part may move the shaper to shift the optical path of the parallel light.

Advantageous Effects

According to an embodiment, since there is no need to consider a moving space of an optical element such as a lens, even when an optical image stabilization (OIS) function is implemented, a size of a camera module can be minimized.

According to an embodiment, since the optical element such as the lens is not moved, a resolution of a camera can be improved.

According to an embodiment, since there is no need to consider the movement of the optical element such as the lens, a design of the camera module is easy.

Useful advantages and effects of the present invention are not limited the above-described contents and will be more easily understood while the specific embodiments of the present invention are described.

DESCRIPTION OF DRAWINGS

FIG. 1 is a side view illustrating a camera module according to an embodiment of the present invention.

FIG. 2 is a set of views for describing a driving process of the camera module according to the embodiment of the present invention.

FIG. 3 is a view illustrating a prism part, a tilting part, and a driving part in the camera module according to the embodiment of the present invention.

FIG. 4 is a view illustrating a state in which the prism part is removed from FIG. 3.

FIG. 5 is a side view illustrating the tilting part according to the embodiment of the present invention.

FIG. 6A is a perspective view illustrating a shaper according to an embodiment of the present invention.

FIG. 6B is a side view illustrating the shaper according to the embodiment of the present invention.

FIG. 6C is a front view illustrating the shaper according to the embodiment of the present invention.

FIG. 6D is a rear view illustrating the shaper according to the embodiment of the present invention.

FIG. 7 is a view for describing a coupling relationship between the driving part and the tilting part according to the embodiment of the present invention.

FIG. 8 is a view for describing driving of the tilting part by the driving part according to the embodiment of the present invention.

FIG. 9 is a view illustrating one example of the driving part according to the embodiment of the present invention.

FIG. 10A is a view for describing a first driving example of the tilting part according to the embodiment of the present invention.

FIG. 10B is a view for describing a second driving example of the tilting part according to the embodiment of the present invention.

FIG. 10C is a view for describing a third driving example of the tilting part according to the embodiment of the present invention.

FIG. 11 is a view for describing a structure of a camera module according to one embodiment of the present invention.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted in a sense generally understandable to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations which can be combined with A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

It should be understood that, when an element is referred to as being "connected or coupled" to another element, such a description may include both a case in which the element is directly connected or coupled to another element and a case in which the element is connected or coupled to another element by still another element disposed therebetween.

In a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

FIG. 1 is a side view illustrating a camera module according to an embodiment of the present invention.

As shown in FIG. 1, the camera module according to the embodiment of the present invention includes a prism part 110, a tilting part 120, a lens part 130, an image sensor part 140, and a driving part 150.

Light 1 incident on the camera module according to the embodiment of the present invention sequentially passes through the prism part 110, the tilting part 120, and the lens part 130 and is incident on the image sensor part 140.

First, the prism part 110 converts the incident light to parallel light. Specifically, the prism part 110 changes a direction of an optical path of the incident light from a Y axis direction to a Z axis direction parallel to a central axis (optical axis) of the lens part 130. For example, in a case in which the camera module is installed in a mobile terminal, the Y axis direction may be a thickness direction of the mobile terminal, and the Z axis direction may be a longitudinal direction or width direction of the mobile terminal. That is, the prism part 110 may convert the incident light incident in the thickness direction of the camera module to the parallel light in a direction perpendicular to the image sensor part 140.

The prism part 110 may be implemented as an optical member formed in a triangular column shape. In addition, the prism part 110 may be implemented as an optical member such as a reflective plate or reflective mirror.

Then, the tilting part 120 allows the parallel light to pass therethrough and changes the optical path of the parallel light. Specifically, the tilting part 120 changes the optical path of the parallel light by changing an angle of a surface through which the parallel light passes. In this case, the angle of the surface through which the parallel light passes may be changed by the driving part 150. The tilting part 120 is disposed between the prism part 110 and the lens part 130.

Next, the driving part 150 moves the tilting part 120 to control a change in the angle of the surface through which the parallel light passes. The driving part 150 may be implemented as a voice coil motor (VCM) and may be implemented as a motor or piezo actuator.

Next, the lens part 130 collects the parallel light of which the optical path is changed. According to the embodiment of the present invention, the lens part 130 may be provided with one or more lenses, and according to another embodiment of the present invention, a lens part 130 may be provided with one or more lens groups, and each of the lens groups may be provided with one or more lenses. In FIG. 1, the lens part 130 provided with three lens groups is illustrated, but the present invention is not limited thereto. The number of lenses or the number of lens groups forming the lens part 130 and the number of lenses forming the lens group may be differently implemented according to a function of the camera module. For example, in order to implement a zoom function in a camera module with a high magnification having the zoom function, the lens part 130 may be provided to include two or more lens groups. In addition, two or more lens groups may include one or more lens groups fixed to a frame of the camera module and one or more lens groups configured to move with respect to an optical axis of the lens part 130.

Next, the image sensor part 140 converts the parallel light collected by the lens part 130 to an electrical signal. The image sensor part 140 may be disposed to be perpendicular to the optical axis of the lens part 130. The image sensor part 140 may be disposed on a printed circuit board (PCB). The image sensor part 140 may include a charge coupled device (CCD) image sensor or a complementary metal-oxide-semiconductor (CMOS) image sensor.

FIG. 2 is a set of views for describing a driving process of the camera module according to the embodiment of the present invention.

FIG. 2A shows a driving process in a case in which the camera module does not shake. FIG. 2B shows a driving process in a case in which the camera module shakes and an optical path of parallel light is not changed. FIG. 3C shows a driving process in a case in which the camera module shakes and the optical path of the parallel light is changed.

For example, in the case in which the camera module does not shake as shown in FIG. 2A, parallel light is incident on the lens part 130 and reaches the image sensor part 140 along an optical path parallel to the optical axis of the lens part 130. When the parallel light parallel to the optical axis is incident on the image sensor part 140 as described above, the camera module may stably capture an image of a subject and output the image.

However, in the case in which the camera module shakes as shown in FIG. 2B, the optical path of the parallel light is tilted by a certain angle with respect to the optical axis of the lens part 130. In this case, unlike FIG. 2A, the parallel light is incident on a portion spaced apart from a center of the image sensor by a certain distance. Accordingly, the camera module may capture a shaken image of a subject and output the shaken image.

On the other hand, in the case in which the tilting part 120 changes the optical path of the parallel light to correct as much as shaking of the camera module as shown in FIG. 2C, the parallel light is incident on the image sensor part 140 along the optical axis of the lens part 130. Accordingly, the camera module may stably capture an image of a subject without shaking and outputs the image.

FIG. 3 is a view illustrating the prism part, the tilting part, and the driving part in the camera module according to the embodiment of the present invention. FIG. 4 is a view illustrating a state in which the prism part is removed from FIG. 3.

As shown in FIGS. 3 and 4, the prism part 110, the tilting part 120, and the driving part 150 may be installed in a case 10 to be implemented as one module. A prism installation part in which the prism part 110 may be installed may be formed in the case 10. That is, a space in which the prism part 110 may be installed may be formed as shown in FIG. 4. The case 10 may be formed in a predetermined shape to be coupled to the camera frame and include a hook to be fixed to the camera frame.

As illustrated in FIG. 3, the prism part 110 may be installed in the case 10 through an upper end surface of the case 10. The prism part 110 changes incident light incident in a direction toward the upper end surface of the case 10 to parallel light parallel to the optical axis of the lens part 130 and transmits the parallel light to the tilting part 120. The prism part 110 and the case 10 may be fixed using a coupling member such as a hook.

The tilting part 120 may be disposed on a front surface of the case 10. The front surface of the case 10 means one surface, which is positioned on a progress path of the parallel light, of the case 10. The tilting part 120 may be coupled to the front surface of the case 10 to be disposed perpendicular to the optical axis of the lens part 130. Some components of the driving part 150 may be coupled to the tilting part 120. For example, in a case in which the driving part 150 is implemented as a voice coil motor (VCM) including a magnet and a coil, the magnet may be coupled to the tilting part 120 as shown in FIGS. 3 and 4.

The driving part 150 may be disposed on a side surface of the case 10. Specifically, the driving part 150 may be symmetrically disposed on both side surfaces of the case 10.

FIG. 5 is a side view illustrating the tilting part according to the embodiment of the present invention.

The tilting part 120 may be provided to include a first flat glass 121, an optical liquid layer 122, a second flat glass 124, and a shaper 125. Parallel light passing through the tilting part 120 sequentially passes through the first flat glass 121, the optical liquid layer 122, and the second flat glass 124.

The first flat glass 121 may be formed in a container form having a flat shape in which a groove is formed, wherein the groove may be filled with an optical liquid. The first flat glass 121 may be formed of a transparent material through which light may pass and may be formed of borosilicate.

The optical liquid layer 122 may be positioned between two flat glasses and formed of an optical liquid which has liquidity through which light may pass. The optical liquid may fill the first flat glass 121 to form the optical liquid layer 122. A refractive index of the optical liquid may range from 1 to 1.5. The optical liquid may include perfluoro polyether (PFPE).

The optical liquid layer 122 may be sealed by an elastic film member 123, such as a membrane, not to flow to the outside in a state in which the optical liquid layer 122 fills the first flat glass 121. Since the optical liquid layer 122 is sealed by the elastic film member 123, the optical liquid is not mixed with foreign matter. The elastic film member 123 may be attached to an edge of the first flat glass 121 filled with the optical liquid to seal the optical liquid layer 122. In this case, the elastic film member 123 is formed of a transparent material through which light may pass. The elastic film member 123 is expandable and shrinkable. The elastic film member 123 may be formed of polydimethyl siloxane (PDMS).

The second flat glass 124 is attached to the elastic film member 123 to be disposed on an upper end of the optical liquid layer 122. The second flat glass 124 may be a member formed in a flat shape and may be formed to have a width less than a width of the optical liquid layer 122 and less than a width of the groove of the first flat glass 121. The second flat glass 124 may be formed of a transparent material through which light may pass. The second flat glass 124 may be formed of borosilicate.

The shaper 125 may be coupled to the second flat glass 124. Specifically, the shaper 125 may be coupled to one surface opposite to one surface of the second flat glass 124 to which the elastic film member 123 is attached. The shaper 125 may be formed of a member having a flat shape and may have a rectangular flat shape. The shaper 125 may include coupling grooves in corner portions thereof to be coupled to the driving part 150. In addition, the shaper 125 may have a hall through which parallel light may pass. The shaper 125 may be formed of a metal.

In the tilting part 120 according to the embodiment of the present invention, the second flat glass 124 coupled to the shaper 125 is tilted by a certain angle according to movement of the shaper 125. In addition, since the second flat glass 124 is tilted by the certain angle, a shape of the optical liquid layer 122 is changed. Accordingly, an angle of a surface through which parallel light passes is changed so that an optical path of the parallel light can be changed.

FIG. 6A is a perspective view illustrating the shaper according to the embodiment of the present invention. FIG. 6B is a side view illustrating the shaper according to the embodiment of the present invention. FIG. 6C is a front view illustrating the shaper according to the embodiment of the present invention. FIG. 6D is a rear view illustrating the shaper according to the embodiment of the present invention.

As illustrated in FIGS. 6A to 6D, the shaper 125 may be implemented in a flat rectangular shape. Specifically, the shaper 125 may be implemented in a rectangular plate shape of which a length in an X axis direction is greater than a length in the Y axis direction. For example, in the case of a camera module used in a mobile terminal, an L-type camera structure is necessarily required to implement a high magnification zoom function. However, in the case of the mobile terminal, there is a problem in that a thickness thereof cannot be increased unlike a camera device such as a digital single lens reflex (DSLR) camera. Accordingly, when compared to a direction of a light path in which light passes (that is, the Z axis direction which is a direction in which parallel light passes), there is a spatial limit in a thickness direction of the mobile terminal (that is, the Y axis direction which is a direction of a light path along which incident light passes). In a case in which a space is increased in the Y axis direction, there is a problem of increasing the thickness of the mobile terminal. Accordingly, in the camera module according to the embodiment of the present invention, the shaper 125 included in the tilting part 120 is implemented in the rectangular plate shape to solve the above described problem.

Referring to FIGS. 6A to 6D again, in the rectangular shaped shaper 125, four coupling grooves 125-1 to 125-4 coupled to the driving part 150 may be formed in the corners thereof. The shaper 125 may be moved by the driving part 150 coupled to the corners thereof. In addition, in the shaper 125, a hole 125-5 through which parallel light may pass may be formed. In this case, a diameter of the hole may be less than a diameter of the second flat glass 124. The second flat glass 124 may be coupled to a portion in which the hole is formed and the hole may be concentric with the second flat glass 124. In addition, in the shaper 125, grooves 125-6 may be further formed to be coupled to the case illustrated in FIGS. 3 and 4, or a shape of a front surface may be different from a shape of a rear surface.

FIG. 7 is a view for describing a coupling relationship between the driving part and the tilting part according to the embodiment of the present invention. FIG. 8 is a view for describing driving of the tilting part by the driving part according to the embodiment of the present invention.

In FIGS. 7 and 8, the case in which the driving part 150 is implemented as the VCM is illustrated. In the case in which the driving part 150 is implemented as the VCM, the driving part 150 may include a plurality of coils and a plurality of magnets.

First, the plurality of magnets may be coupled to the plurality of coupling grooves 125-1 to 125-4 formed in the shaper 125. As shown in FIGS. 6A to 6D, the rectangular shaped shaper 125 may include four coupling grooves 125-1 to 125-4 formed at the corner and a maximum of four magnets may be coupled thereto. According to another embodiment of the present invention, as illustrated in FIGS. 7 and 8, two magnets may be coupled using both of two coupling grooves disposed in a short axis direction of a shaper 125.

In this case, the plurality of magnets may be disposed so that polarities of portions thereof coupled to the plurality of coupling grooves 125-1 to 125-4 may be the same. For example, as shown in FIGS. 7 and 8, the plurality of magnets may be disposed so that portions thereof coupled to the shaper 125 are N-poles. Unlike FIGS. 7 and 8, the plurality of magnets may also be disposed so that the portions thereof coupled to the shaper 125 may be S-poles.

The plurality of coils may be disposed to be spaced apart from each other to correspond to the plurality of magnets. That is, the plurality of coils may be disposed to correspond to the coupling grooves of the shaper 125. A current may be applied to the plurality of coils according to a control signal. In this case, the current may have a magnitude allowing the shaper 125 to be tilted so as to shift a light path of parallel light at an angle formed between the parallel light and the optical axis due to shaking of the camera module.

FIG. 9 is a view illustrating one example of the driving part according to the embodiment of the present invention.

FIG. 9 is a view illustrating a case in which the driving part 150 is implemented as a motor or piezo actuator. The motor or the piezo actuator is not driven by a magnet or a coil unlike a VCM. Accordingly, the shaper 125 is directly connected to the motor or the piezo actuator through connection members. That is, the coupling grooves of the shaper 125 may be directly coupled to the motor or piezo actuator through the connecting members.

FIG. 10A is a view for describing a first driving example of the tilting part according to the embodiment of the present invention. FIG. 10B is a view for describing a second driving example of the tilting part according to the embodiment of the present invention. FIG. 10C is a view for describing a third driving example of the tilting part according to the embodiment of the present invention.

First, as shown in FIG. 10A, in the camera module according to the embodiment of the present invention, the tilting part 120 may be controlled by the driving part 150 coupled to two coupling grooves positioned in a long axis direction of the shaper 125. For example, the shaper 125 may be moved in the Z axis direction by the driving part 150 coupled to the first and second coupling grooves 125-1 and 125-2 positioned in the same long axis direction to control an angle of a surface, through which parallel light passes, of the tilting part 120. As another embodiment, the shaper 125 may be moved in the Z axis direction by the driving part 150 coupled to the third and fourth coupling grooves 125-3 and 125-4 positioned in the same long axis to control an angle of the surface, through which the parallel light passes, of the tilting part 120.

Next, as shown in FIG. 10B, in the camera module according to the embodiment of the present invention, the tilting part 120 may be controlled by the driving part 150 coupled to two coupling grooves positioned in a short axis direction of the shaper 125. For example, the shaper 125 may be moved in the Z axis direction by the driving part 150 coupled to the first and third coupling grooves 125-1 and 125-3 positioned in the same short axis direction to control an angle of the surface, through which the parallel light passes, of the tilting part 120. As another example, the shaper 125 may be moved in the Z axis direction by the driving part 150 coupled to the second and fourth coupling groove 125-2 and 125-4 positioned in the same long direction to control an angle of the surface, through which the parallel light passes, of the tilting part 120.

Next, as shown in FIG. 10C, in the camera module according to the embodiment of the present invention, the tilting part 120 may be controlled by the driving part 150 coupled to two coupling grooves positioned in a diagonal direction of the shaper 125. For example, the shaper 125 may be moved by the driving part 150 coupled to the first and fourth coupling grooves 125-1 and 125-4 positioned in the same diagonal direction to control an angle of the surface, through which the parallel light passes, of the tilting part 120. As another example, the shaper 125 may be moved in the Z axis direction by the driving part 150 coupled to the second and third coupling grooves 125-2 and 125-3 positioned in the same diagonal direction to control an angle of the surface, through which the parallel light passes, of the tilting part 120.

FIG. 11 is a view for describing a structure of a camera module according to one embodiment of the present invention.

Unlike the camera module illustrated in FIG. 1, in FIG. 11, a camera module, which does not include the prism part 110, is illustrated. An L-Type camera module may be used to implement a camera module having a high magnification zoom function in a device such as a mobile terminal having a thickness limit. However, the L-Type camera module may not be used in a mobile terminal in which a high magnification zoom function is not implemented. Accordingly, the camera module according to the embodiment of the present invention may be implemented not to include a prism part 110 and to include a tilting part 120, a lens part 130, an image sensor part 140, and a driving part 150 as shown in FIG. 11.

In addition, while the present invention has been mainly described above with reference to the embodiments, it will be understood by those skilled in the art that the invention is not limited to the embodiments, and the embodiments are only exemplary, and various modifications and applications which are not illustrated above may be made within the range of the present invention without departing from the essential features of the present embodiments. For example, components specifically described in the embodiments may be modified and implemented. In addition, it should be understood that differences related to modifications and applications fall within the scope of the present invention defined by the appended claims.

The invention claimed is:

1. A camera module comprising:
a prism part configured to convert incident light to parallel light in an optical axis direction;
a tilting part through which the parallel light passes and which changes an optical path of the parallel light by changing an angle of a surface through which the parallel light passes, the tilting part including:
a first flat glass including a groove formed therein to accommodate liquid and formed of a transparent material allowing the parallel light to pass therethrough;
an optical liquid layer disposed in the groove of the first flat glass and formed of an optical liquid allowing the parallel light to pass therethrough and having liquidity;
an elastic film member attached to the first flat glass to seal the optical liquid layer in the groove of the first flat glass;
a second flat glass disposed on the elastic film member and formed of a transparent material allowing the parallel light to pass therethrough; and
a shaper having a flat shape and coupled to one surface of the second flat glass, and including a hole formed in a portion coupled to the second flat glass allowing the parallel light to pass therethrough;
a lens part configured to collect the parallel light of which the optical path is changed; and
an image sensor part configured to convert the parallel light collected by the lens part to an electrical signal,
wherein the tilting part is disposed between the prism part and the lens part.

2. The camera module of claim 1, further comprising a driving part configured to move the tilting part to control a change of an angle of the surface through which the parallel light passes.

3. The camera module of claim 2, wherein:
the shaper is formed in a rectangular flat shape; and
a plurality of coupling grooves coupled to the driving part are formed at corners of the shaper.

4. The camera module of claim 3, wherein the driving part includes:
a plurality of magnets coupled to the plurality of coupling grooves; and
a plurality of coils spaced apart from each other by a predetermined distance to correspond to the plurality of magnets.

5. The camera module of claim 4, wherein, in the driving part, each of the number of the plurality of magnets and the number of the plurality of coils is two.

6. The camera module of claim 3, wherein the tilting part is controlled by the driving part coupled to two coupling grooves positioned in a diagonal direction of the shaper.

7. The camera module of claim 3, wherein the tilting part is controlled by the driving part coupled to two coupling grooves positioned in a long axis direction of the shaper.

8. The camera module of claim 3, wherein the tilting part is controlled by the driving part coupled to two coupling grooves positioned in a short axis direction of the shaper.

9. The camera module of claim 2, wherein the driving part moves the shaper to shift the optical path of the parallel light.

10. A camera module comprising:
a prism part configured to convert incident light to parallel light in an optical axis direction;
a tilting part through which the parallel light passes and which changes an optical path of the parallel light by changing an angle of a surface through which the parallel light passes, the tilting part including:
a first flat glass including a groove formed therein to accommodate liquid and formed of a transparent material allowing the parallel light to pass therethrough;
an optical liquid layer disposed in the groove of the first flat glass and formed of an optical liquid allowing the parallel light to pass therethrough and having liquidity;
an elastic film member attached to the first flat glass to seal the optical liquid layer in the groove of the first flat glass;

a second flat glass disposed on the elastic film member and formed of a transparent material allowing the parallel light to pass therethrough; and a shaper having a flat shape and coupled to one surface of the second flat glass, and including a hole formed in a portion coupled to the second flat glass allowing the parallel light to pass therethrough;

a lens part configured to collect the parallel light of which the optical path is changed;

an image sensor part configured to convert the parallel light collected by the lens part to an electrical signal; and a driving part configured to move the tilting part to control a change of an angle of the surface through which the parallel light passes, wherein the tilting part is disposed between the prism part and the lens part, wherein the shaper is formed in a rectangular flat shape, and wherein a plurality of coupling grooves coupled to the driving part are formed at corners of the shaper.

11. The camera module of claim 10, wherein the driving part includes:

a plurality of magnets coupled to the plurality of coupling grooves; and a plurality of coils spaced apart from each other by a predetermined distance to correspond to the plurality of magnets.

12. The camera module of claim 11, wherein, in the driving part, each of the number of the plurality of magnets and the number of the plurality of coils is two.

13. The camera module of claim 10, wherein the tilting part is controlled by the driving part coupled to two coupling grooves positioned in a diagonal direction of the shaper.

14. The camera module of claim 10, wherein the tilting part is controlled by the driving part coupled to two coupling grooves positioned in a long axis direction of the shaper.

15. The camera module of claim 10, wherein the tilting part is controlled by the driving part coupled to two coupling grooves positioned in a short axis direction of the shaper.

* * * * *